(12) United States Patent
Lissianoi et al.

(10) Patent No.: US 8,929,370 B2
(45) Date of Patent: Jan. 6, 2015

(54) MECHANISM FOR EFFICIENTLY TRANSMITTING TUNNEL KEEP-ALIVE MESSAGES

(75) Inventors: Sergei Lissianoi, Billerica, MA (US); Prasad Vadassery, Dracut, MA (US); Lawrence DiBurro, Haverhill, MA (US)

(73) Assignee: Avaya Inc., Basking Ridge, NJ (US)

( * ) Notice: Subject to any disclaimer, the term of this patent is extended or adjusted under 35 U.S.C. 154(b) by 140 days.

(21) Appl. No.: 13/594,113

(22) Filed: Aug. 24, 2012

(65) Prior Publication Data

US 2014/0056203 A1 Feb. 27, 2014

(51) Int. Cl.
H04L 12/28 (2006.01)

(52) U.S. Cl.
USPC .......................................... 370/390; 392/410

(58) Field of Classification Search
USPC .................. 370/390, 392, 393, 410
See application file for complete search history.

(56) References Cited

U.S. PATENT DOCUMENTS

| | | | | |
|---|---|---|---|---|
| 2007/0121574 A1* | 5/2007 | Igarashi et al. | ............... | 370/351 |
| 2008/0123524 A1* | 5/2008 | Vasseur et al. | ............... | 370/228 |
| 2008/0271137 A1* | 10/2008 | Sinn | ............................... | 726/15 |
| 2009/0052317 A1* | 2/2009 | Takagi et al. | ................. | 370/223 |
| 2009/0067407 A1* | 3/2009 | Jia et al. | ......................... | 370/350 |
| 2009/0164611 A1* | 6/2009 | Corda et al. | .................. | 709/222 |
| 2010/0054152 A1* | 3/2010 | Foschiano et al. | ............ | 370/253 |
| 2010/0290446 A1* | 11/2010 | Atreya et al. | ................. | 370/338 |
| 2010/0296413 A1* | 11/2010 | Nimon et al. | ................. | 370/254 |
| 2011/0135303 A1* | 6/2011 | Hufferd | .......................... | 398/45 |
| 2012/0076151 A1* | 3/2012 | Finn | .............................. | 370/401 |

* cited by examiner

Primary Examiner — Andrew Lee
(74) Attorney, Agent, or Firm — Anderson Gorecki & Rouille LLP

(57) ABSTRACT

A method, apparatus and computer program product for efficiently transmitting tunnel keep-alive messages is presented. A tunnel keep-alive trigger message is provided from a control processor of a multi-processor network switching device to at least one forwarding engine of the network switching device. The at least one of the forwarding engines produces a tunnel keep-alive packet as a result of receiving the tunnel keep-alive trigger message from the control processor. The at least one forwarding engine forwards the tunnel keep-alive packet on all tunnels the forwarding engine is servicing.

12 Claims, 4 Drawing Sheets

MECHANISM FOR EFFICIENTLY TRANSMITTING TUNNEL KEEP-ALIVE MESSAGES

BACKGROUND

The Wireless Local Area Network (LAN) split-plane architecture involves creation of tunnels between pairs of switches or between Access Points (APs) and switches. A single switch may terminate hundreds of tunnels. Certain types of tunnels, for example Control and Provisioning of Wireless Access Points (CAPWAP) tunnels, utilize a "keep-alive" (also referred to herein as a "heartbeat") mechanism that monitors tunnel reachability and availability. Typically, a keep-alive packet is transmitted every second on each tunnel. If a heartbeat packet is not received for a predetermined period of time or if a response to a heartbeat tunnel is not received within a predetermined period of time, the tunnel end-point or the tunnel itself are assumed to be non-functional and the tunnel is torn down to free up bandwidth. While the presently described mechanism for efficiently transmitting a large number of tunnel keep-alive messages is described with respect to a WLAN, the concepts apply equally well to other tunneling protocols that incorporate a heartbeat/keep-alive mechanism.

SUMMARY

Conventional mechanisms such as those explained above suffer from a variety of deficiencies. One such deficiency is that conventional networks that incorporate a heartbeat/keep-alive mechanism require the control processor of the network switching device to construct keep-alive packets separately for each tunnel. Accordingly, the current solution does not scale well to a large number of tunnels. The control processor on a mobility switch is required to create and transmit keep-alive packets individually on all the tunnels; however this utilizes large amounts of CPU cycles and can lead to excessive congestion. This in turn impedes the functions of other basic protocols.

The presently described mechanism for efficiently transmitting a large number of tunnel keep-alive messages greatly reduces the load on the mobility switch control processor and the mechanism associated with transmitting hundreds of keep-alive messages every second. An intra-node multicast mechanism is utilized wherein a single packet trigger transmission is used by the forwarding engines of the network switching device to send the keep-alive messages for multiple tunnels.

In a particular embodiment of a method for providing tunnel keep-alive messages the method includes providing a tunnel keep-alive trigger message from a control processor of a multi-processor network switching device to at least one forwarding engine of the network switching device. The method further include producing, by the at least one of the forwarding engine, a tunnel keep-alive packet as a result of receiving the tunnel keep-alive trigger message from the control processor. The method also includes forwarding, by the at least one forwarding engine, the tunnel keep-alive packet on all tunnels the forwarding engine is servicing.

Other embodiments include a computer readable medium having computer readable code thereon for providing tunnel keep-alive messages. The computer readable medium includes instructions for providing a tunnel keep-alive trigger message from a control processor of a multi-processor network switching device to at least one forwarding engine of the network switching device. The computer readable medium further includes instructions for producing, by the at least one of the forwarding engine, a tunnel keep-alive packet in response to receiving the tunnel keep-alive trigger message from the control processor. The computer readable medium also includes instructions for forwarding, by the at least one forwarding engine, the tunnel keep-alive packet to all tunnels the forwarding engine is servicing.

Still other embodiments include a computerized device (the network switching device), configured to process all the method operations disclosed herein as embodiments of the invention. In such embodiments, the computerized device includes a memory system, a processor, and a communications interface in an interconnection mechanism connecting these components. The memory system is encoded with a process that provides a mechanism for efficiently transmitting a large number of tunnel keep-alive messages as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a network switching device provides associated operations providing a mechanism for efficiently transmitting a large number of tunnel keep-alive messages as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
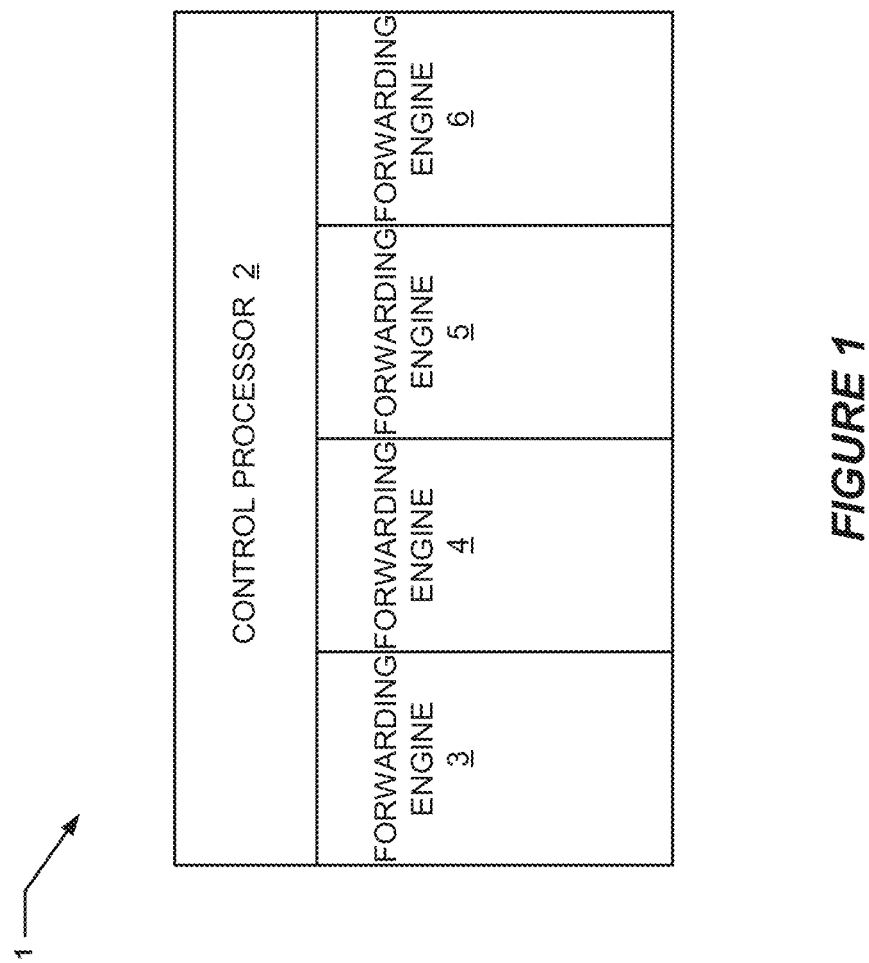
FIG. 1 illustrates a block diagram of a network switching device in accordance with embodiments of the invention.

The presently described method and apparatus for transmitting a large number of keep-alive messages can be realized in a multi-processor router or switch (e.g. a mobility switch or access point collectively referred to herein as network switching devices). As shown in FIG. 1, a network switching device 1 typically include a single or redundant Control Processor 2 and multiple Forwarding Engines 3, 4, 5, and 6. Although only four Forwarding engines and a single Control processor are shown, it should be understood that any number of Control Processors and/or Forwarding Engines may be included in a network switching device. A mobility domain (e.g., mobility domain 10) may include hundreds of mobility switches. The Control Processor 2 processes and stores configuration commands, maintains Layer 2 and Layer 3 forwarding tables, and manages tunnels. A Forwarding Engine 3, 4, 5 or 6 processes and transmits the data packets based on the information programmed by the Control Processor 2. These Forwarding Engines 3, 4, 5 or 6 include processors that have the ability to replicate a single data packet into multiple packets and transmit them to multiple destinations. The ability to replicate packets in a system is done by using MGID (Multicast Group Identifier) as the destination of a packet. An MGID and members of an MGID (network interfaces) are programmed throughout the entire system, which enables hardware replication at various stages.

The term "tunnel encapsulation record" as used herein denotes the set of data required for building a tunnel packet. In case of Ethernet and CAPWAP it includes source and destination MAC and IP addresses, the UDP port number and the ID of the network interface for transmitting the packet. Tunnel encapsulation records are distributed across multiple Forwarding Engines that are serving all the tunnels in the system.

Figure 2:
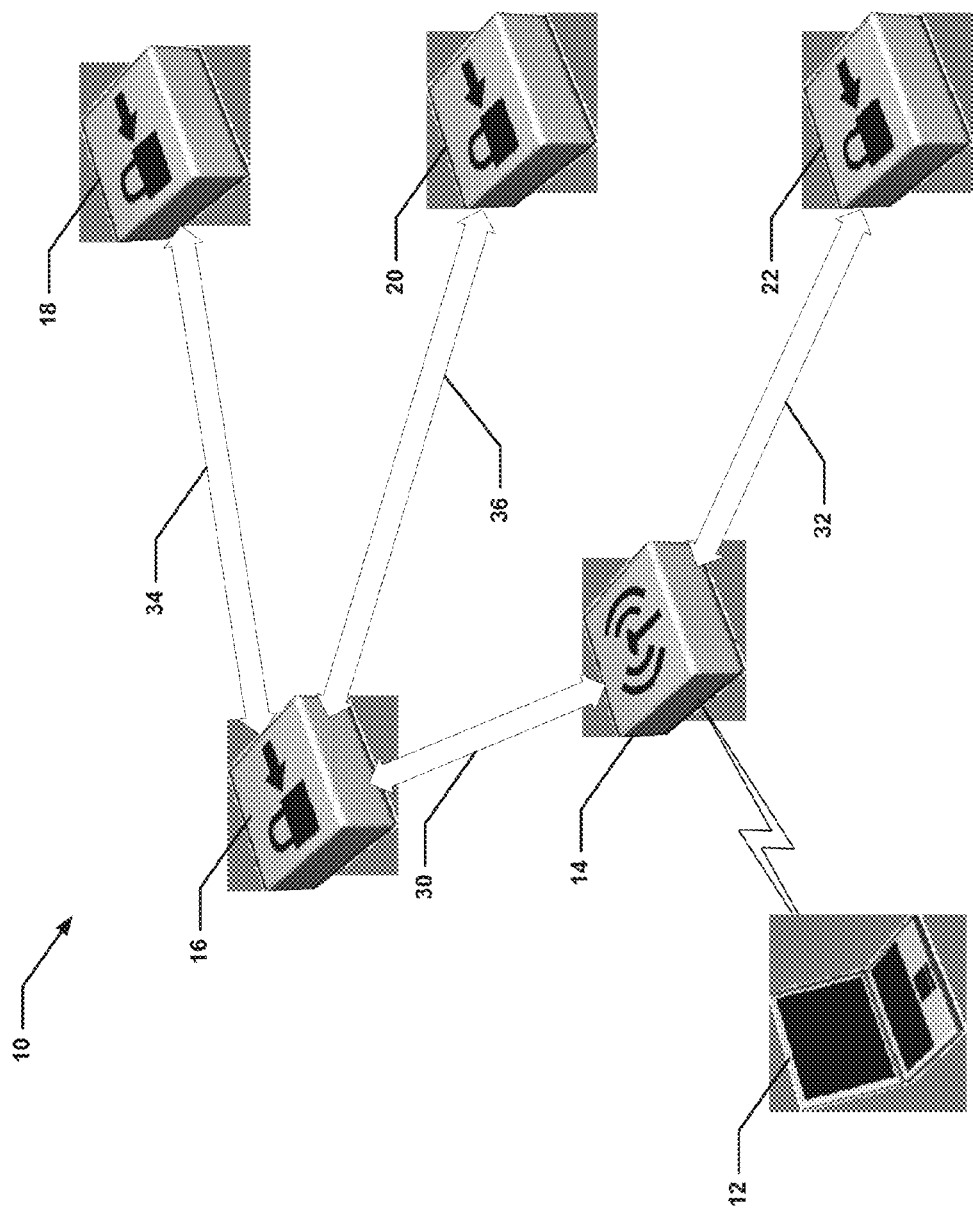
FIG. 2 illustrates a network environment including tunnels in accordance with embodiments of the invention.

Referring to FIG. 2, a mobility domain 10 is shown. This example mobility domain 10 includes a Mobile Unit (MU) 12, an Access Point (AP) 14 and four Mobility Switches (MSs) 16, 18, 20 and 22. A first access tunnel 30 is provided between AP 14 and MS 16 and a second access tunnel 32 is provided between AP 14 and MS 22. A first mobility tunnel 34 is provided between MS 16 and MS 18. A second mobility tunnel 36 is provided between MS 16 and MS 20.

Each mobility switch includes a mobility agent (not shown) that, respectively, communicates with a wireless controller (not shown) using a Control and Provisioning of Wireless Access Points (CAPWAP)-like interface. Further, for example, a mobility agent in a mobility switch communicates with mobility agents in other mobility switches and with access point 14 using data plane protocols.

Although only four mobility switches are shown, it should be understood that a mobility domain (e.g., mobility domain 10) may include hundreds of mobility switches. In such an arrangement, the mobility switches may be interconnected in a mesh network by a plurality of mobility tunnels constructed between each mobility switch. Likewise, although only one access point 14 is shown, thousands of access points may be included in a mobility domain 10, with plural access points connected to a particular mobility switch over access tunnels. Similarly, although only one mobile unit 12 is shown, there may be tens of thousands of mobile units roaming among the plurality of access points connected to various mobility switches. Example mobile units include laptop computers, cellular telephones, Personal Digital Assistants (PDAs) and the like.

The keep-alive transmission is triggered by a timer running on the Control Processor. When the timer fires a single trigger packet is generated; based on its MGID destination that packet is forwarded to all Forwarding Engines. A Forwarding Engine receives the packet and creates a new CAPWAP keep-alive packet based on the stored tunnel encapsulation information. The Forwarding Engine then forwards the keep-alive packet to all the tunnels it is serving.

This solution eliminates the Control Processor load associated with generating and transmitting individual keep-alive packets for each tunnel—instead the load is distributed to multiple Forwarding Engines. The solution also eliminates the overhead on the intra-node communication framework associated with delivering multiple keep-alive packets to the Forwarding Engines for transmission—instead the multicast capability is utilized to use a single trigger packet.

Figure 3:
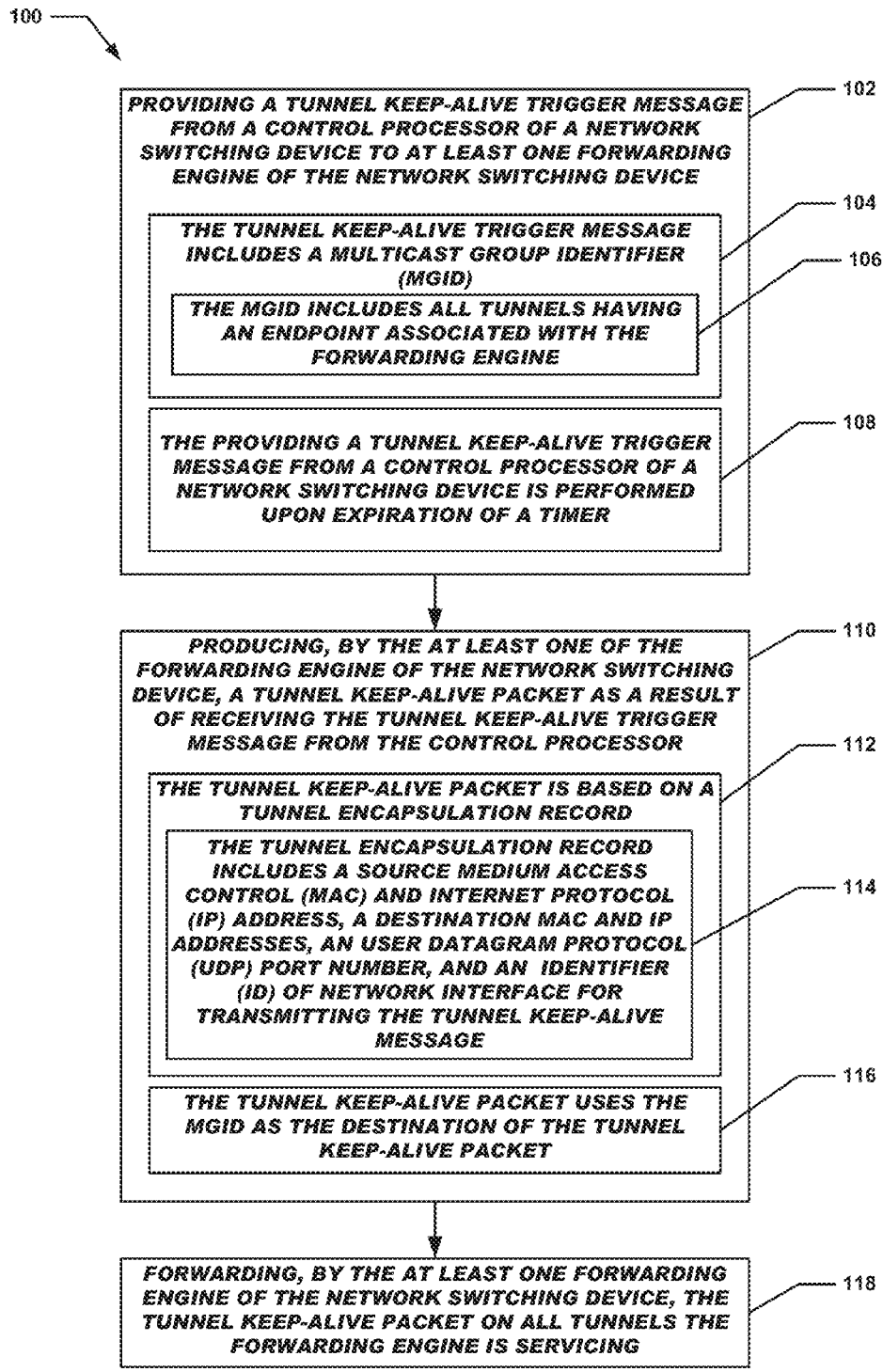
FIG. 3 illustrates a flow diagram of a particular embodiment of a method for efficiently transmitting a large number of tunnel keep-alive messages in accordance with embodiments of the invention.

A flow chart of a particular embodiment of the presently disclosed method is depicted in FIG. 3. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a flow diagram of a particular method 100 for providing tunnel keep-alive messages is shown. Method 100 starts with processing block 102 which discloses providing a tunnel keep-alive trigger message from a control processor of a network switching device to at least one forwarding engine of the network switching device.

As shown in processing block 104 the tunnel keep-alive trigger message includes a Multicast Group Identifier (MGID). As further shown in processing block 106 the MGID includes all tunnels having an endpoint associated with the forwarding engine. Processing block 108 states the providing a tunnel keep-alive trigger message from a control processor of a network switching device is performed upon expiration of a timer.

In a particular embodiment the timer expires once per second, although it should be understood that any time value can be used Processing continues with processing block 110 which recites producing, by the at least one of the forwarding engine of the network switching device, a tunnel keep-alive packet in response to receiving the tunnel keep-alive trigger message from the control processor. Processing block 112 discloses the tunnel keep-alive packet is based on a tunnel encapsulation record. As further disclosed in processing block 114, the tunnel encapsulation record includes a source Medium Access Control (MAC) and Internet Protocol (IP) address, a destination MAC and IP addresses, an User Datagram Protocol (UDP) port number, and an Identifier (ID) of network interface for transmitting the tunnel keep-alive message. As shown in processing block 116, the tunnel keep-alive packet uses the MGID as the destination of the tunnel keep-alive packet Processing block 118 states forwarding, by the at least one forwarding engine of the network switching device, the tunnel keep-alive packet to all tunnels the forwarding engine is servicing.

Figure 4:
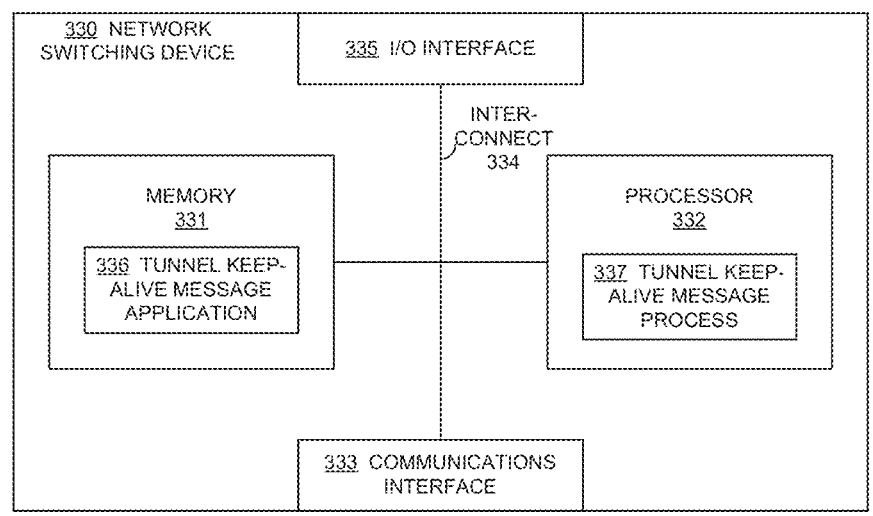
FIG. 4 illustrates an example computer system architecture for a network switching device that efficiently transmits a large number of tunnel keep-alive messages in accordance with embodiments of the invention.

FIG. 4 is a block diagram illustrating example architecture of a network switching device 330 that executes, runs, interprets, operates or otherwise performs a application 336 in a tunnel keep-alive message process 337 suitable for use in explaining example configurations disclosed herein. As shown in this example, the mobility switch 330 includes a memory 331 encoded with the tunnel keep-alive message application 336 and a processor 332 on which the tunnel keep-alive message process 337 runs. Further, a communications interface 333 and an input/output (I/O) interface 335 are provided, with an interconnection mechanism 334, such as a data bus or other circuitry, that couples the memory 331, the processor 332, the communications interface 333 and the I/O interface 334. The communications interface 333 enables the mobility switch 330 to communicate with other devices (e.g., access points and other mobility switches) on a network (not shown).

The memory 331 is any type of computer readable medium and, in this example, is encoded with a tunnel keep-alive message application 336 as explained herein. The tunnel keep-alive message application 336 may be embodied as software code such as data and/or logic instructions (e.g., code stored in the memory or on another computer readable medium such as a removable disk) that supports processing functionality according to different embodiments described herein. During operation of the mobility switch 330, the processor 332 accesses the memory 331 via the interconnect 334 in order to launch, run, execute, interpret or otherwise perform the logic instructions of the tunnel keep-alive message application 336. Execution of the tunnel keep-alive message application 336 in this manner produces processing functionality in the tunnel keep-alive message process 337. In other words, the tunnel keep-alive message process 337 represents one or more portions or runtime instances of the tunnel keep-alive message application 336 (or the entire tunnel keep-alive message application 336) performing or executing within or upon the processor 332 in the mobility switch 330 at runtime.

It is noted that example configurations disclosed herein include the tunnel keep-alive message application 336, itself (i.e., in form of un-executed or non-performing logic instructions and/or data). The tunnel keep-alive message application 336 may be stored on a computer readable medium (e.g., a floppy disk, hard disk, electronic, magnetic, optical, or other computer readable medium). A tunnel keep-alive message application 336 may also be stored in a memory 331 such as in firmware, read only memory (ROM), or, as in this example, as executable code in, for example, Random Access Memory (RAM). In addition to these embodiments, it should also be noted that other embodiments herein include the execution of a tunnel keep-alive message application 336 in the processor 332 as the tunnel keep-alive message process 337. Those skilled in the art will understand that the mobility switch 330 may include other processes and/or software and hardware components, such as an operating system not shown in this example.

During operation, processor 313 of computer system 300 accesses memory system 312 via the interconnect 311 in order to launch, run, execute, interpret or otherwise perform the logic instructions of the keep-alive message application 340-1. Execution of keep-alive message application 340-1 produces processing functionality in keep-alive message process 340-2. In other words, the keep-alive message process 340-2 represents one or more portions of the keep-alive message application 340-1 (or the entire application) performing within or upon the processor 313 in the computer system 300.

It should be noted that, in addition to the keep-alive message process 340-2, embodiments herein include the keep-alive message application 340-1 itself (i.e., the un-executed or non-performing logic instructions and/or data). The keep-alive message application 340-1 can be stored on a computer readable medium such as a floppy disk, hard disk, or optical medium. The keep-alive message application 340-1 can also be stored in a memory type system such as in firmware, read only memory (ROM), or, as in this example, as executable code within the memory system 312 (e.g., within Random Access Memory or RAM).

In addition to these embodiments, it should also be noted that other embodiments herein include the execution of persistent security application 140-1 in processor 113 as the persistent security process 140-2. Those skilled in the art will understand that the computer system 100 can include other processes and/or software and hardware components, such as an operating system that controls allocation and use of hardware resources associated with the computer system 100.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A computer-implemented method in which a network switching device performs operations comprising:
    providing a tunnel keep-alive trigger message from a control processor of a network switching device to at least one forwarding engine of said network switching device, wherein said tunnel keep-alive trigger message includes a Multicast Group Identifier (MGID);
    producing, by said at least one of said forwarding engine of said network switching device, a tunnel keep-alive packet as a result of receiving said tunnel keep-alive trigger message from said control processor, wherein said tunnel keep-alive packet uses said MGID as the destination of said tunnel keep-alive packet and wherein said MGID includes all tunnels having an endpoint associated with said forwarding engine of said network switching device; and
    forwarding, by said at least one forwarding engine of said network switching device, said tunnel keep-alive packet on all tunnels said forwarding engine is servicing.

2. The method of claim 1 wherein said tunnel keep-alive packet is based on a tunnel encapsulation record.

3. The method of claim 1 wherein said providing a tunnel keep-alive trigger message from a control processor of a network switching device is performed upon expiration of a timer.

4. The method of claim 2 wherein said tunnel encapsulation record includes a source Medium Access Control (MAC) and Internet Protocol (IP) address, a destination MAC and IP addresses, an User Datagram Protocol (UDP) port number, and an Identifier (ID) of network interface for transmitting said tunnel keep-alive message.

5. A non-transitory computer readable storage medium having computer readable code thereon for transmitting a plurality of tunnel keep-alive messages, the medium including instructions in which a computer system performs operations comprising:
    providing a tunnel keep-alive trigger message from a control processor of a network switching device to at least one forwarding engine of said network switching device, wherein said tunnel keep-alive trigger message includes a Multicast Group Identifier (MGID);
    producing, by said at least one of said forwarding engine of said network switching device, a tunnel keep-alive packet as a result of receiving said tunnel keep-alive trigger message from said control processor, wherein said tunnel keep-alive packet uses said MGID as the destination of said tunnel keep-alive packet and wherein said MGID includes all tunnels having an endpoint associated with said forwarding engine of said network switching device; and
    forwarding, by said at least one forwarding engine of said network switching device, said tunnel keep-alive packet on all tunnels said forwarding engine is servicing.

6. The non-transitory computer readable storage medium of claim 5 wherein said tunnel keep-alive packet is based on a tunnel encapsulation record.

7. The non-transitory computer readable storage medium of claim 5 wherein said providing a tunnel keep-alive trigger message from a control processor of a network switching device is performed upon expiration of a timer.

8. The non-transitory computer readable storage medium of claim 7 wherein said tunnel encapsulation record includes a Medium Access Control (MAC) and Internet Protocol (IP) address, a destination MAC and IP addresses, an User Datagram Protocol (UDP) port number, and an Identifier (ID) of network interface for transmitting said tunnel keep-alive message.

9. A network switching device comprising:
a memory;
a processor;
a communications interface;
an interconnection mechanism coupling the memory, the processor and the communications interface; and
wherein the memory is encoded with an application for transmitting a plurality of tunnel keep-alive messages, that when performed on the processor, provides a process for processing information, the process causing the network switching device to perform the operations of:
providing a tunnel keep-alive trigger message from a control processor of a network switching device to at least one forwarding engine of said network switching device, wherein said tunnel keep-alive trigger message includes a Multicast Group Identifier (MGID);;
producing, by said at least one of said forwarding engine of said network switching device, a tunnel keep-alive packet as a result of receiving said tunnel keep-alive trigger message from said control processor, wherein said tunnel keep-alive packet uses said MGID as the destination of said tunnel keep-alive packet and wherein said MGID includes all tunnels having an endpoint associated with said forwarding engine of said network switching device; and
forwarding, by said at least one forwarding engine of said network switching device, said tunnel keep-alive packet on all tunnels said forwarding engine is servicing.

10. The network switching device of claim 9 wherein said tunnel keep-alive packet is based on a tunnel encapsulation record.

11. The network switching device of claim 9 wherein said providing a tunnel keep-alive trigger message from a control processor of a network switching device is performed upon expiration of a timer.

12. The network switching device of claim 11 wherein said tunnel encapsulation record includes a source Medium Access Control (MAC) and Internet Protocol (IP) addresses, a destination MAC and IP addresses, a User Datagram Protocol (UDP) port number, and an Identifier (ID) of network interface for transmitting said tunnel keep-alive message.

* * * * *